(12) United States Patent
Yeh

(10) Patent No.: US 9,130,398 B2
(45) Date of Patent: Sep. 8, 2015

(54) WIRELESSLY-CHARGEABLE STRENGTH-RESISTANT LIGHT-EMITTING OR HEAT-EMITTING STRUCTURE

(71) Applicant: Winharbor Technology Co., Ltd., New Taipei (TW)

(72) Inventor: Ming-Hsiang Yeh, Taipei (TW)

(73) Assignee: Winharbor Technology Co., Ltd. (TW)

( * ) Notice: Subject to any disclaimer, the term of this patent is extended or adjusted under 35 U.S.C. 154(b) by 0 days.

(21) Appl. No.: 14/663,516

(22) Filed: Mar. 20, 2015

(65) Prior Publication Data

US 2015/0194841 A1 Jul. 9, 2015

Related U.S. Application Data

(62) Division of application No. 12/929,885, filed on Feb. 23, 2011, now Pat. No. 9,012,816.

(51) Int. Cl.
*H05B 1/02* (2006.01)
*H02J 7/02* (2006.01)
*H05B 3/34* (2006.01)

(52) U.S. Cl.
CPC .............. *H02J 7/025* (2013.01); *H05B 1/0272* (2013.01); *H05B 3/342* (2013.01)

(58) Field of Classification Search
CPC .............. H05B 1/02; H05B 3/54; H05B 6/66; H05B 3/345; H05B 2203/015; H05B 2203/014; H05B 2203/017; H05B 2203/036
USPC .......... 219/488, 483–486, 492, 497, 502, 494, 219/211, 214; 362/108, 212, 800; 2/108, 2/905
See application file for complete search history.

(56) References Cited

U.S. PATENT DOCUMENTS

| | | | | |
|---|---|---|---|---|
| 4,037,083 | A * | 7/1977 | Leavines | 219/552 |
| 6,066,799 | A * | 5/2000 | Nugent | 174/27 |
| 6,737,610 | B1 * | 5/2004 | Horn et al. | 219/212 |
| 6,737,616 | B1 * | 5/2004 | Sherrill | 219/536 |
| 7,277,628 | B2 * | 10/2007 | Giamati | 392/444 |
| 7,816,632 | B2 * | 10/2010 | Bourke et al. | 219/635 |
| 8,074,373 | B2 * | 12/2011 | Macher et al. | 36/2.6 |
| 8,169,185 | B2 * | 5/2012 | Partovi et al. | 320/108 |
| 2007/0182367 | A1 * | 8/2007 | Partovi | 320/108 |
| 2008/0211302 | A1 * | 9/2008 | Hirota et al. | 307/1 |
| 2009/0289046 | A1 * | 11/2009 | Richmond | 219/211 |
| 2012/0000903 | A1 * | 1/2012 | Baarman et al. | 219/620 |
| 2013/0285558 | A1 * | 10/2013 | Recker et al. | 315/153 |

* cited by examiner

*Primary Examiner* — Mark Paschall
(74) *Attorney, Agent, or Firm* — Bacon & Thomas, PLLC

(57) ABSTRACT

The present invention provides a stretch-resistant light-emitting or heat-emitting structure. The wirelessly-chargeable stretch-resistant light-emitting structure includes a woven member, conductive twisted cables, a light-emitting element, and a receiver circuit. The woven member is mounted to the article. Each conductive twisted cable includes a stretch-resistant wire and a conductive wire twisted together. The conductive twisted cables are woven in the woven member. The light-emitting element, which is arranged inside the woven member, includes a light emission section and two conductive pins. The conductive pins are respectively and electrically connected to the conductive wires of the conductive twisted cables. The wirelessly-chargeable stretch-resistant heat-emitting structure includes a carrying member, an electrical heating element mounted to the carrying member, conductive twisted cables that are in electrical connection with the electrical heating element, and a receiver circuit that is in electrical connection with the conductive twisted cables. The carrying member is woven in the article.

10 Claims, 15 Drawing Sheets

WIRELESSLY-CHARGEABLE STRENGTH-RESISTANT LIGHT-EMITTING OR HEAT-EMITTING STRUCTURE

FIELD OF THE INVENTION

The present invention relates to a stretch-resistant light-emitting or heat-emitting structure, and in particular to a stretch-resistant light-emitting or heat-emitting structure that is wirelessly chargeable and is applicable to an article to be worn on a human body, and shows the properties of stretch resistance, pull resistance, water washability, and deflectability, and also features light emission and/or heat emission.

BACKGROUND OF THE INVENTION

Conventionally, to additionally mount a light-emitting structure or a heat-emitting structure to an article to be worn on a human body (such as garment, jacket, shirt, vest, underwear, pants, skirt, hat, glove, swimming suit, swimming cap, wet suit, sock, earmuffs, and bag and backpack) for emission of light or for heating purposes, the only practice that was known is to mount light-emitting elements to a jacket or a hat to improve nighttime atmosphere, amusing, or aesthetics effect.

However, the article to be worn on a human body must be subjected to cleaning, which is often done with water. During water washing, the article is stretched, twisted, and deflected and this makes the conventional way of simply attaching light-emitting structure to the article not fit, for water washing operation or otherwise stretching and deflecting the article may lead to breaking of power supply wires.

Further, electrical power that is used to operate the light-emitting elements is often supplied from a rechargeable battery, such as nickel-hydride battery and lithium battery. This rechargeable battery is re-chargeable by a charging device, which is electrically connected in a wired fashion to for example an electrical socket so that the electrical power for charging the battery is supplied through a cable or wire to the rechargeable battery. This limits the spatial range of usage and reduces the convenience of use.

Thus, it is desired to provide a stretch-resistant light-emitting or heat-emitting structure that shows the properties of stretch resistance, pull resistance, water washability, and deflectability and is also capable of emitting light and/or heat. This is the primary objective of the present invention.

SUMMARY OF THE INVENTION

An objective of the present invention is to provide a wirelessly-chargeable stretch-resistant light-emitting structure, which comprises a unique arrangement of conductive twisted cables to ensure stretch resistance, pull resistance, water washability, and deflectability, and is re-chargeable in a wirelessly chargeable fashion to ensure supply of electrical power from a rechargeable battery for energizing and lighting a light-emitting element.

To achieve the above objective, the present invention provides a wirelessly-chargeable stretch-resistant light-emitting structure, which is applicable to an article to which a charging device is coupled. The charging device comprises a transmitter circuit and a power source that is connected to the transmitter circuit so that the power source supplies electrical power to the transmitter circuit and the electrical power is converted by the transmitter circuit into an alternate-current (AC) signal. The wirelessly-chargeable stretch-resistant light-emitting structure comprises a woven member, which is mounted to the article; at least two conductive twisted cables, each of which comprises at least one stretch-resistant wire and at least one conductive wire twisted together, the two conductive twisted cables being woven in the woven member; at least one light-emitting element, which is arranged inside the woven member and comprises a light emission section and at least two conductive pins, wherein the light emission section emits light projecting out of the woven member and the two conductive pins are respectively and securely in electrical engagement with the conductive wires of the two conductive twisted cables; and a receiver circuit, which is mounted to the article and is electrically connected to the conductive wires of the two conductive twisted cables and comprises a rechargeable battery, whereby the transmitter circuit transmits, in a wireless fashion, the AC signal to the receiver circuit and the receiver circuit receives and converts the AC signal into electrical power that is stored in the rechargeable battery for subsequent supply to the light-emitting element.

As such, besides being powered by the rechargeable battery, which is chargeable in a wireless fashion, for emission of light, the article also features stretch resistance, pull resistance, water washability, and deflectability.

A secondary objective of the present invention is to provide a wirelessly-chargeable stretch-resistant heat-emitting structure, which comprises a unique arrangement of conductive twisted cables to ensure stretch resistance, pull resistance, water washability, and deflectability, and realizes supply of electrical power from a rechargeable battery, which is rechargeable in a wireless fashion, for powering a heat-emitting element to give off heat.

To achieve the above objective, the present invention provides a wirelessly-chargeable stretch-resistant heat-emitting structure, which is applicable to an article to which a charging device is coupled. The charging device comprises a transmitter circuit and a power source that is connected to the transmitter circuit so that the power source supplies electrical power to the transmitter circuit and the electrical power is converted by the transmitter circuit into an alternate-current (AC) signal. The wirelessly-chargeable stretch-resistant heat-emitting structure comprises at least one carrying member, which is woven in the article; at least one electrical heating element, which is mounted to the carrying member; at least two conductive twisted cables, each of which comprises at least one stretch-resistant wire and at least one conductive wire twisted together, the conductive wires of the two conductive twisted cables each having an end electrically connected to the electrical heating element; and a battery-based receiver circuit, which is electrically connected to an opposite end of each of the conductive wires of the conductive twisted cables and comprises a rechargeable battery, whereby the transmitter circuit transmits, in a wireless fashion, the AC signal to the receiver circuit and the receiver circuit receives and converts the AC signal into electrical power that is stored in the rechargeable battery for subsequent supply of electrical power to the electrical heating element.

As such, besides being powered by the rechargeable battery, which is chargeable in a wireless fashion, for emission of heat for warm keeping purposes, the article also features stretch resistance, pull resistance, water washability, and deflectability.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1A:
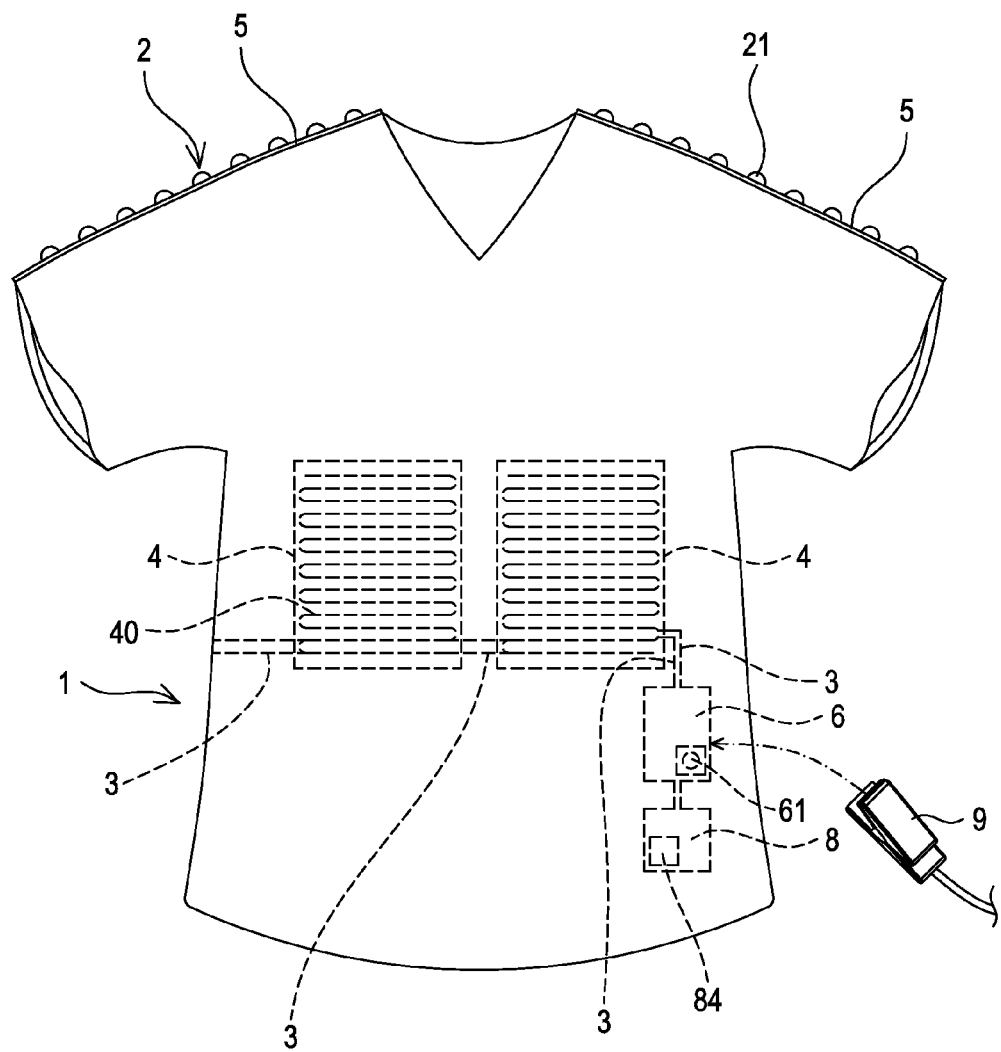
FIG. 1A is a schematic view showing the present invention applied to a front of an article.
Figure 1B:
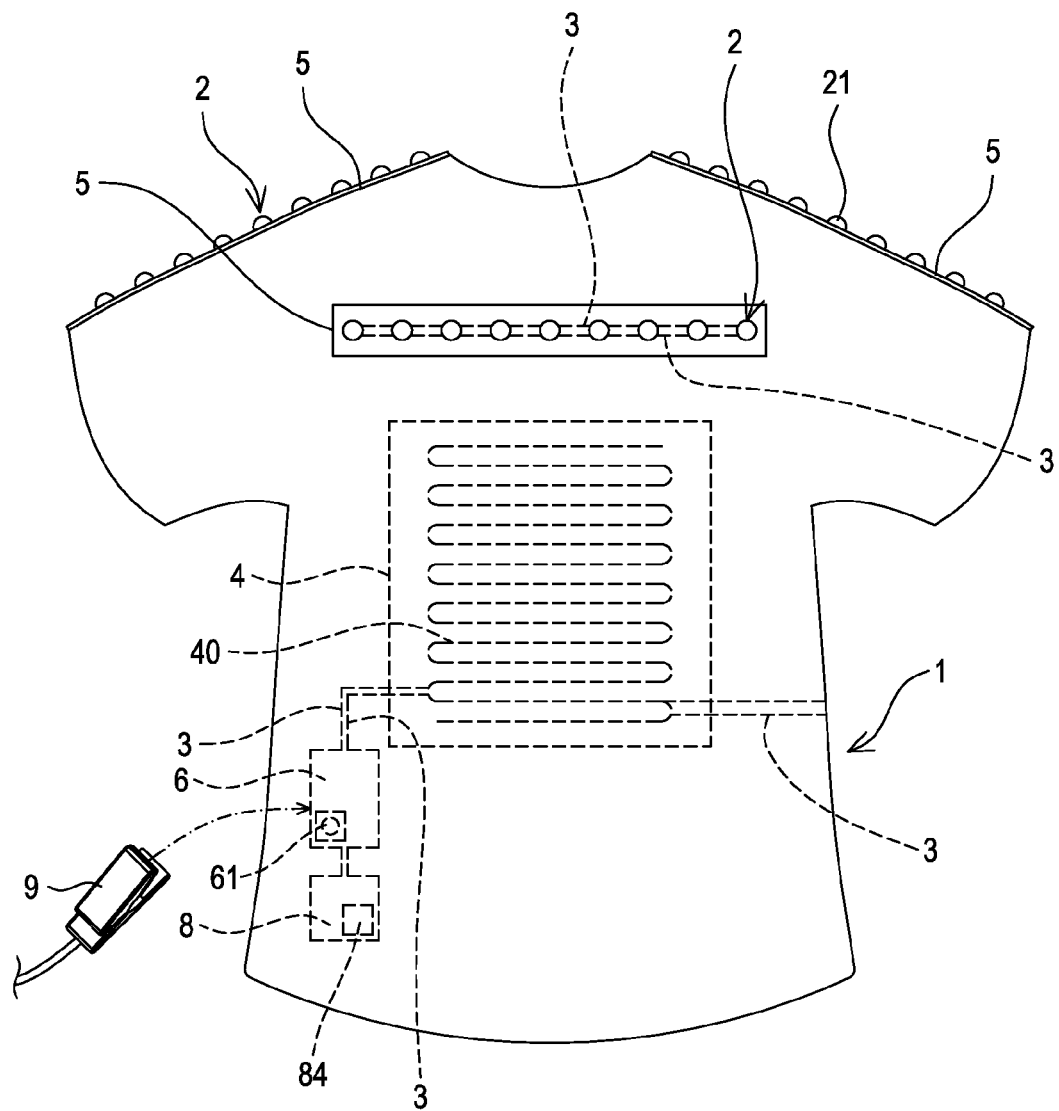
FIG. 1B is a schematic view showing the present invention applied to a back of an article.

With reference to the drawings and in particular to FIGS. 1A-4B, the present invention provides a stretch-resistant light-emitting or heat-emitting structure, which is applied to an article to be put on the body of a user (such as garment, jacket, shirt, vest, underwear, pants, skirt, hat, glove, swimming suit, swimming cap, wet suit, sock, earmuffs, and bag and backpack). A charging device 9 is coupled to the article (by means of for example clamping, bonding, adhering, or mutual attraction). The charging device 9 comprises a transmitter circuit 91 and a power source 92 connected to the transmitter circuit 91. The power source 92 supplies electrical power to the transmitter circuit 91 and the electrical power is converted by the transmitter circuit 91 into an alternate-current (AC) signal.

Referring to FIGS. 1A, 1B, 2A, 2B, and 4, 4A and 4B, an article 1 (which in the embodiment illustrated in the drawings is a garment) is provided with a plurality of wirelessly-chargeable stretch-resistant light-emitting structures and a plurality of wirelessly-chargeable stretch-resistant heat-emitting structure. The wirelessly-chargeable stretch-resistant light-emitting structures are respectively mounted to shoulders and back of the article 1. Each of the wirelessly-chargeable stretch-resistant light-emitting structures comprises a woven member 5, at least two conductive twisted cables 3, at least one light-emitting element 2, and a receiver circuit 8. In the embodiment shown in the drawings, the stretch-resistant light-emitting structure comprises two conductive twisted cables 3 and a plurality of the light-emitting elements 2. The light-emitting element 2 can be a light-emitting diode (LED) or an organic light-emitting diode (OLED).

Figure 3:
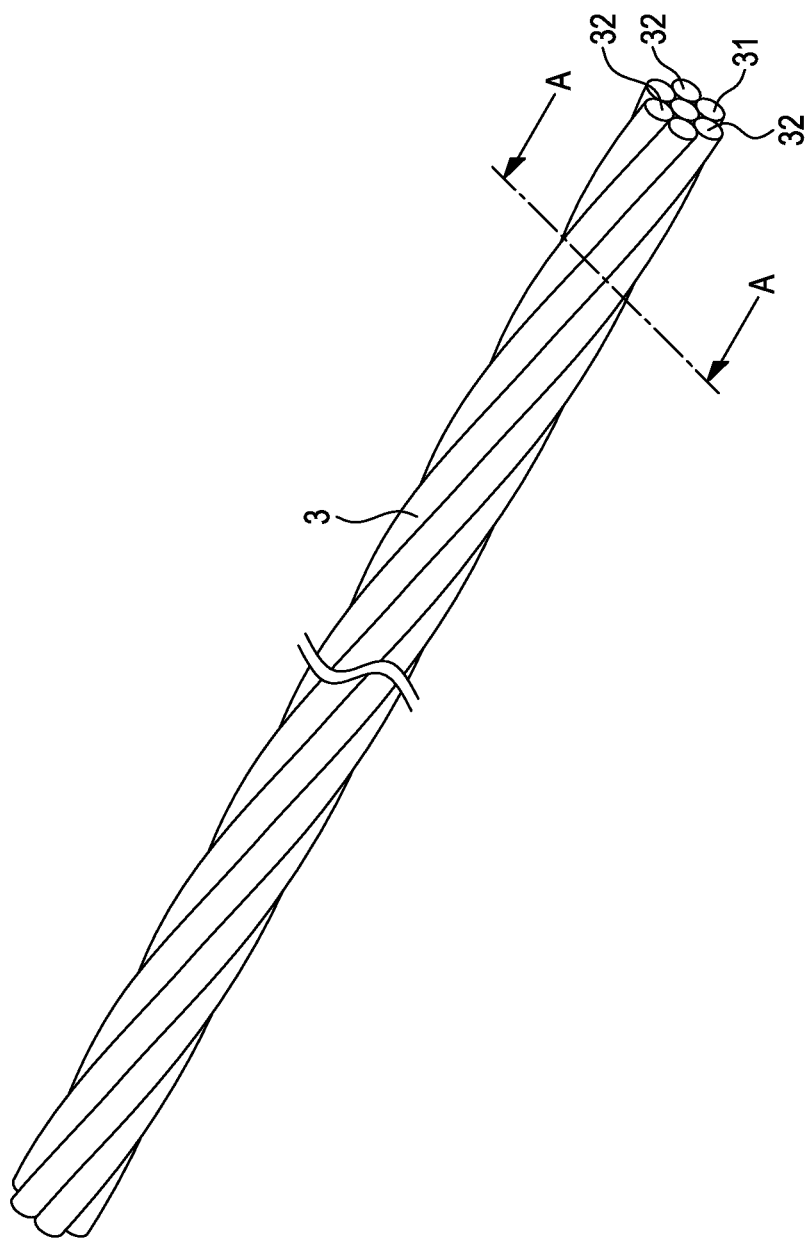
FIG. 3 is a perspective view of a conductive twisted cable according to the present invention.
Figure 3A:
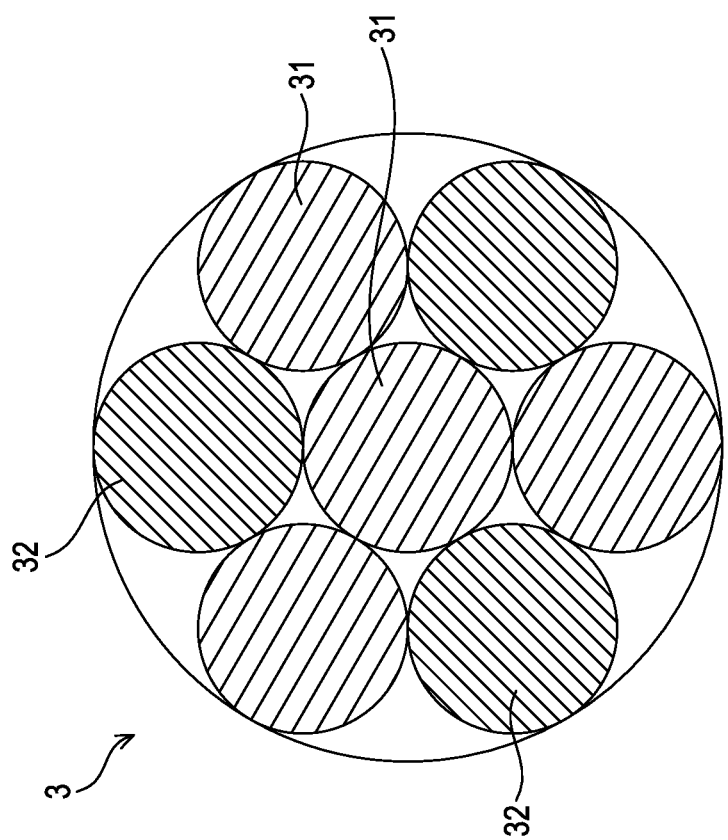
FIG. 3A is a cross-sectional view taken along line A-A of FIG. 3.

As to the conductive twisted cables 3, as shown in FIGS. 3 and 3A, each conductive twisted cable 3 comprises at least one stretch-resistant wire 31 and at least one electrically conductive wire 32 twisted together. In the embodiment illustrated, the conductive twisted cable 3 comprises a plurality of stretch-resistant wires 31 and a plurality of electrically conductive wires 32, wherein the stretch-resistant wire 31 is more stretch-resistant than the electrically conductive wire 32. Preferably, each electrically conductive wire 32 is a conductive wire made of a stretch-resistant material to provide the electrically conductive wire 32 with the properties of stretch resistance, pull resistance, and deflectability.

Figure 4:
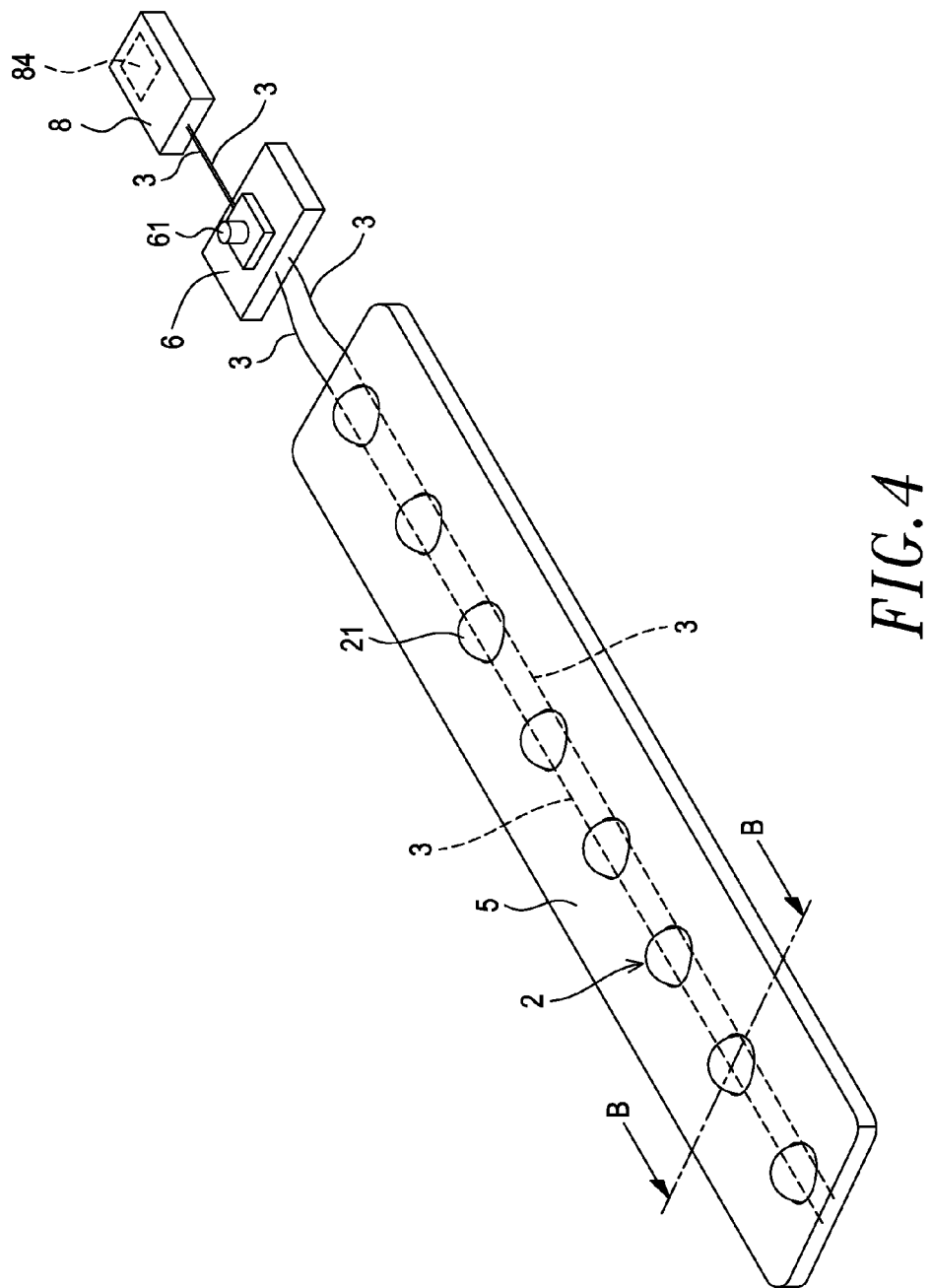
FIG. 4 is a perspective view showing a wirelessly-chargeable stretch-resistant light-emitting structure according to the present invention.
Figure 4A:
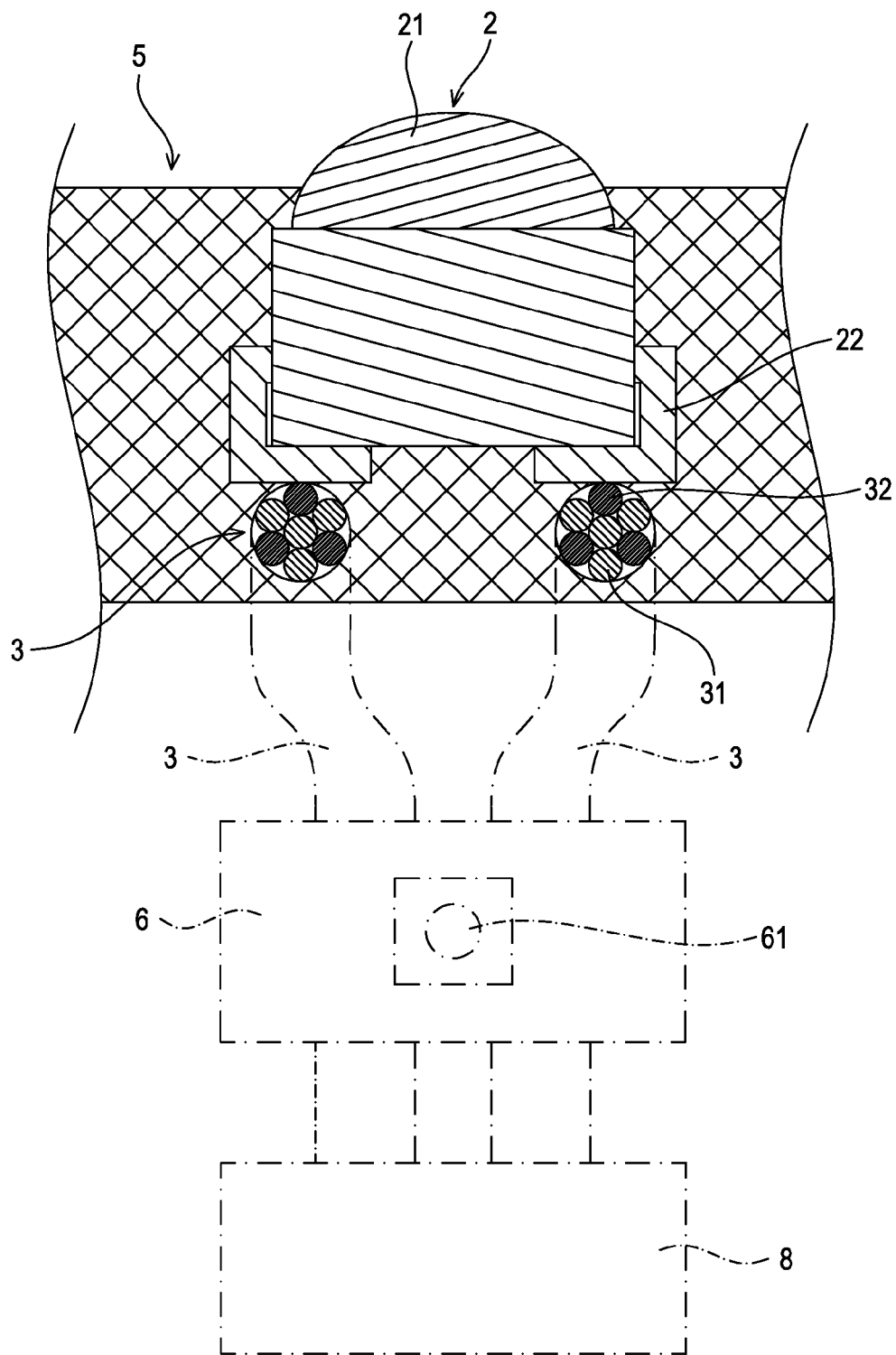
FIG. 4A is a cross-sectional view taken along line B-B of FIG. 4, also showing a control circuit, a rechargeable battery, and a switch electrically connected to the conductive twisted cable.

As to the light-emitting element 2, as shown in FIG. 4A, each light-emitting element 2 comprises a light emission section 21 and at least two conductive pins 22. The two conductive pins 22 are respectively in secured electrical engagement with the conductive wires 32 of the two conductive twisted cables 3. Connection between the conductive pins 22 and the conductive twisted cables 3 can be realized through for example soldering, stamping and pressing, and application of adhesives.

Figure 2A:
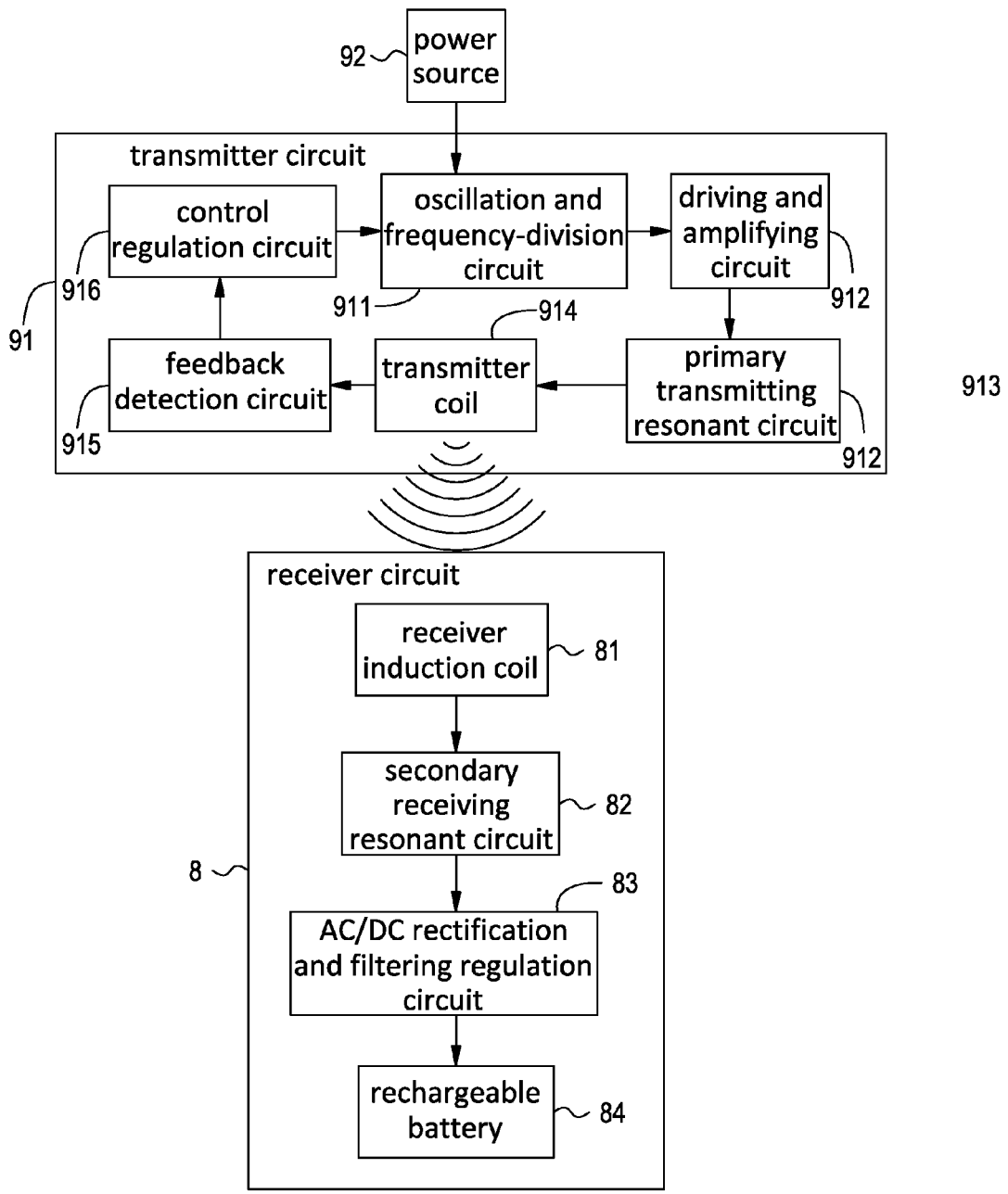
FIGS. 2A and 2B are circuit diagrams of the present invention.
Figure 2B:
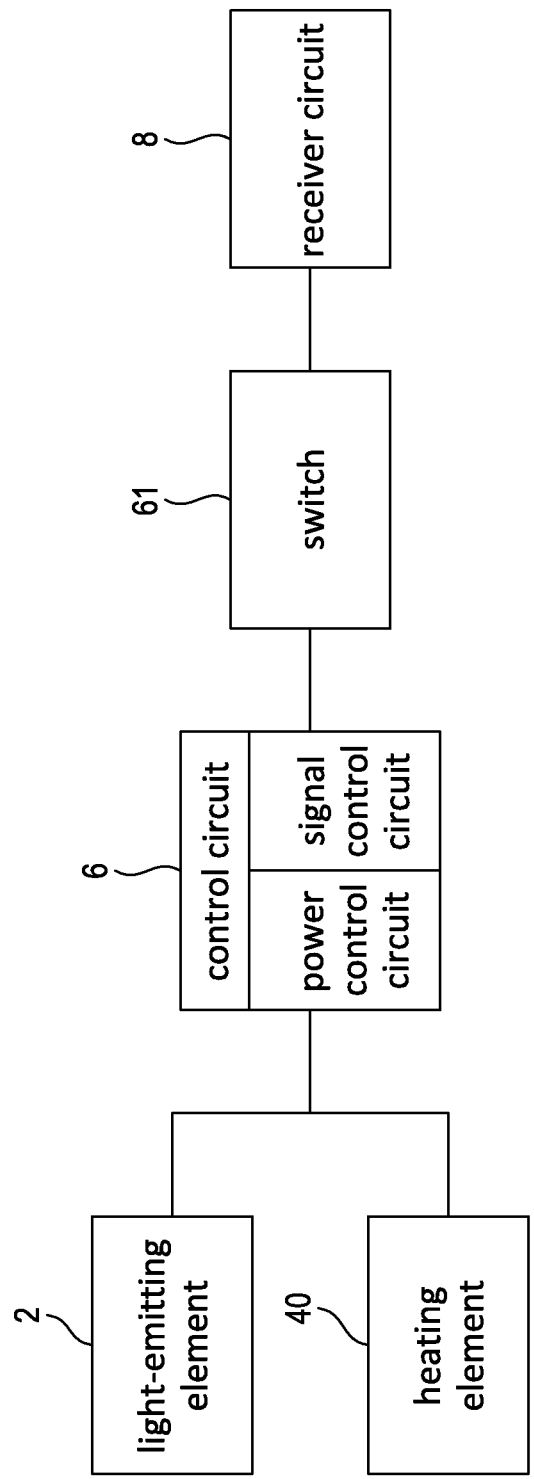

FIGS. 2A and 2B are circuit diagrams of the present invention. The light-emitting element 2 of the wirelessly-chargeable stretch-resistant heat-emitting structure, an electrical heating element 40 of a wirelessly-chargeable stretch-resistant heat-emitting structure, a control circuit 6, and a switch 61 are all electrically connected to the receiver circuit 8. The switch 61 controls the supply of electrical power from a rechargeable battery 84 of the receiver circuit 8. The control circuit 6 comprises a power source control circuit and a signal control circuit. The power source control circuit controls if the light-emitting element or the heating element is set ON or OFF. The signal control circuit controls the lighting fashion of the light-emitting element and the heating operation of the heating element (such as temperature and time counting).

The receiver circuit 8 is electrically connected to the conductive wires 32 of the two conductive twisted cables 3 and the receiver circuit 8 comprises a receiver induction coil 81, a secondary receiving resonant circuit 82 connected to the receiver induction coil 81, an AC/DC rectification and filtering regulation circuit 83 connected to the secondary receiving resonant circuit 82, and a rechargeable battery 84 connected to the AC/DC rectification and filtering regulation circuit 83. The rechargeable battery 84 can be a built-in rechargeable battery or an externally connected rechargeable battery for receiving an AC signal that is transmitted from the transmitter circuit 91 and received by the receiver induction coil 81. The AC signal is subjected to resonance by the secondary receiving resonant circuit 82 and is further subjected to rectification and regulation by the AC/DC rectification and filtering regulation circuit 83 so as to convert the AC signal into electrical power. The electrical power is then stored in the rechargeable battery 84 so that the rechargeable battery 84 may subsequently supply the electrical power to each of the light-emitting elements 2.

The transmitter circuit 91 and the power source 92 can be connected in a wired fashion or a wireless fashion. The transmitter circuit 91 comprises an oscillation and frequency-division circuit 911 that is connected to the power source 92, a driving and amplifying circuit 912 connected to the oscillation and frequency-division circuit 911, a primary transmitting resonant circuit 913 connected to the driving and amplifying circuit 912, and a transmitter coil 914 connected to the primary transmitting resonant circuit 913, whereby the oscillation and frequency-division circuit 911 converts the electrical power supplied from the power source 92 into an AC signal, which is then amplified by the driving and amplifying circuit 912, and the amplified AC signal is subjected to resonance by the primary transmitting resonant circuit 913 to be transmitted by the transmitter coil 914 to the receiver circuit 8.

Further, the transmitter circuit 91 may further comprise a feedback detection circuit 915 connected to the transmitter coil 914 and a control regulation circuit 916 connected to the feedback detection circuit 915 and the oscillation and frequency-division circuit 911, whereby the feedback detection circuit 915 feeds the AC signal transmitted by the transmitter coil 914 back to the control regulation circuit 916 to allow the control regulation circuit 916 to regulate the oscillation frequency of the oscillation and frequency-division circuit 911 in order to acquire the optimum result of resonance.

Referring to a first embodiment according to the present invention shown in FIGS. 4 and 4A, the woven member 5 is coupled to the article 1 (by means of for example sewing or being woven on or inside the article 1, the former being shown in the drawings) and is attached to the shoulders and the back of the article 1 as shown in the drawings. The conductive twisted cables 3 are woven in the woven member 5 and the light-emitting elements 2 are arranged inside the woven member 5 with the conductive pins 22 of the light-emitting element 2 being in electrical engagement with the conductive twisted cables 3 for emission of light. Light emitting from the light emission section 21 of each light-emitting element 2 is allowed to project outside the woven member 5. As shown in the drawings, the projection of light is realized through a hole formed in the woven member 5 at a location corresponding to and thus exposing the light emission section 21. Alternatively, the woven member 5 may be formed of a loosened structure (not shown) at a corresponding location to allow the light to travel therethrough.

As such, the conductive twisted cables 3 and the wirelessly-chargeable stretch-resistant light-emitting structure comprising the conductive twisted cables 3 show the properties of stretch resistance, pull resistance, and deflectability and is of electrical conduction to energize the light-emitting elements 2 for emission of light.

Figure 4B:
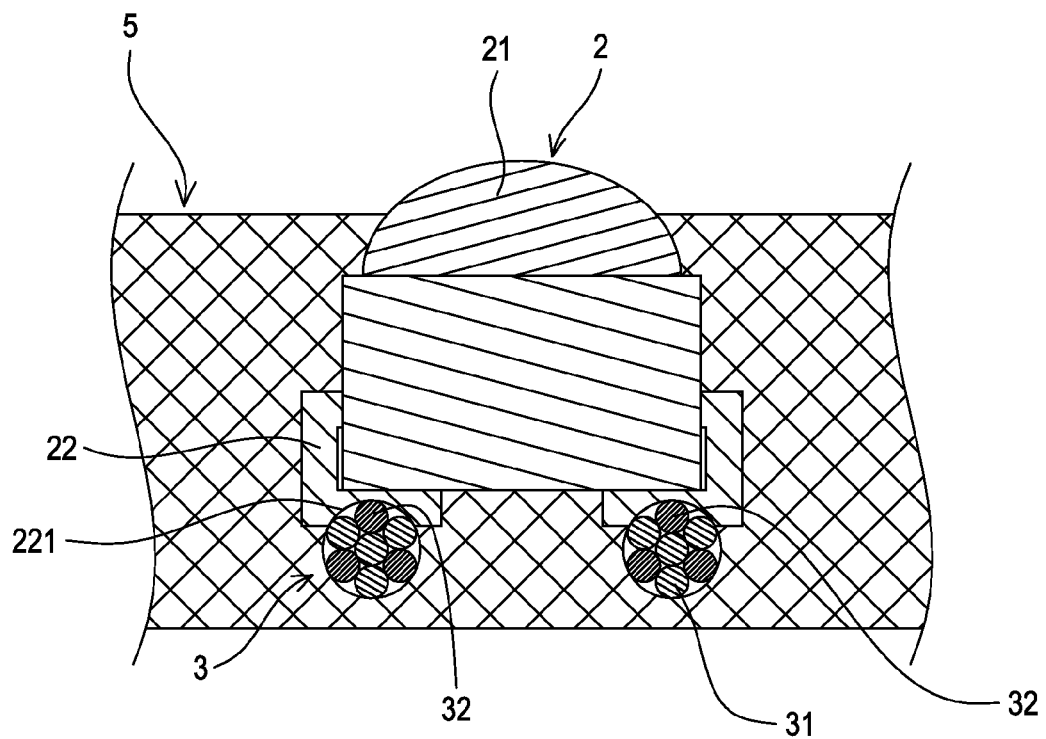
FIG. 4B shows an embodiment formed by modifying the embodiment of FIG. 4A by adding positioning troughs.

Referring to a second embodiment according to the present invention shown in FIG. 4B, preferably, each of the conductive pins 22 of each light-emitting element 2 forms, in a bottom thereof, a positioning trough 221, and the positioning troughs 221 correspond respectively to the conductive twisted cables 3, whereby the conductive twisted cables 3 are respectively receivable and thus positionable in the positioning troughs 221 of the conductive pins 22. Further, the light-emitting element 2 shown in FIGS. 4A and 4B is electrically connected to two conductive twisted cables 3 with the bottoms of the conductive pins 22 respectively contacting the conductive twisted cables 3 and the conductive wires 32 of the conductive twisted cables 3 in electrical engagement with the conductive pins 22.

Figure 5:
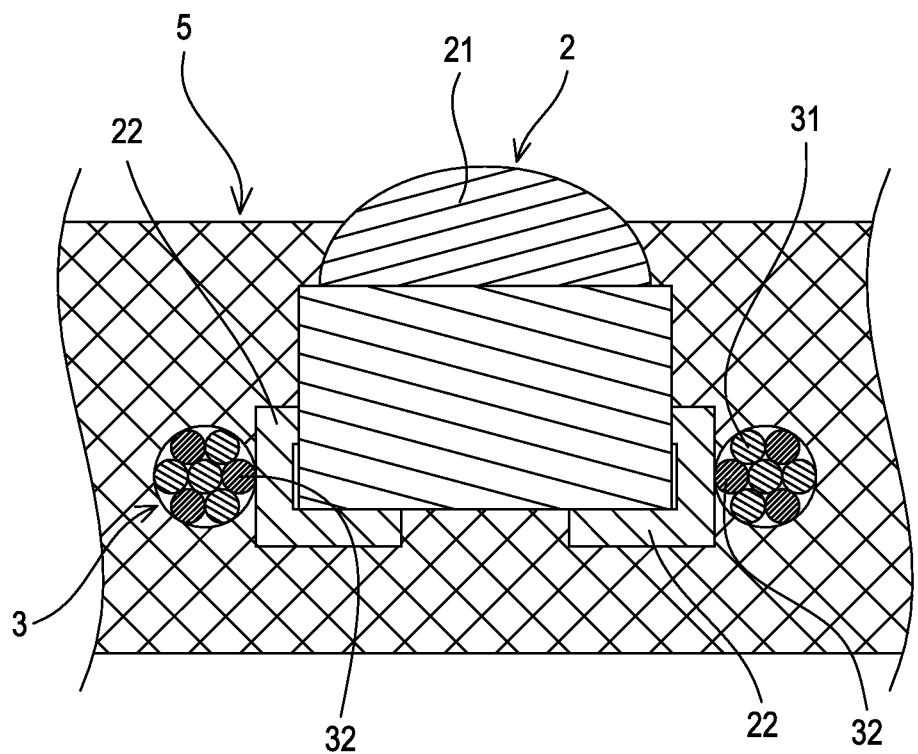
FIG. 5 shows an embodiment of the wirelessly-chargeable stretch-resistant light-emitting structure according to the present invention wherein light-emitting elements are arranged between two conductive twisted cables.
Figure 5A:
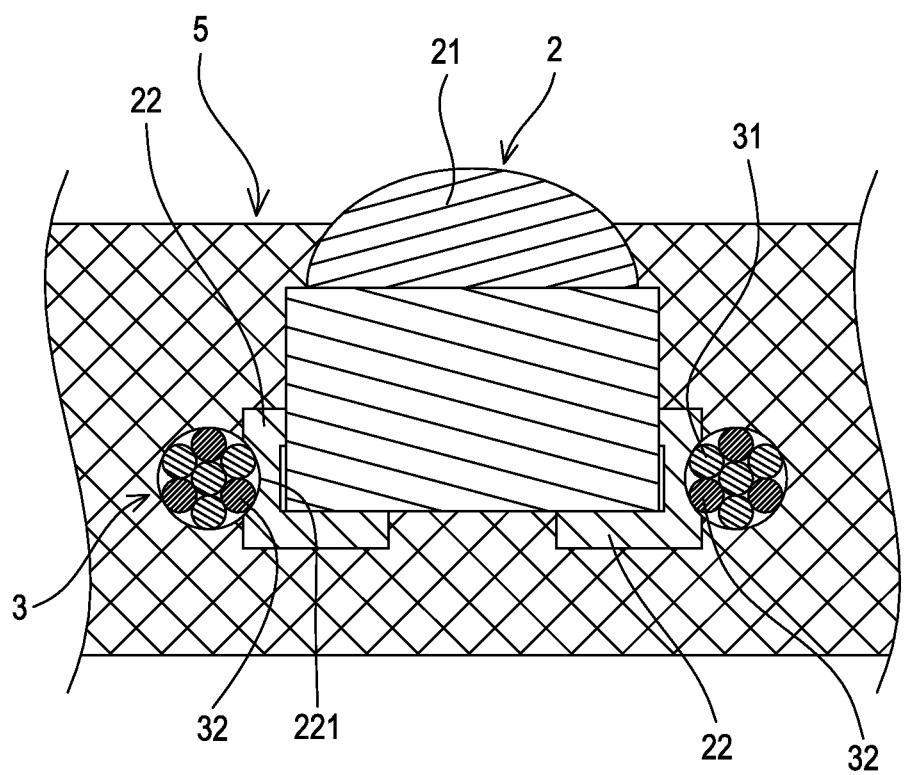
FIG. 5A shows an embodiment formed by modifying the embodiment of FIG. 5 by adding positioning trough.

Referring to third and fourth embodiments according to the present invention shown in FIGS. 5 and 5A, the light-emitting element 2 is set between and in electrical connection with the two conductive twisted cables 3 with the conductive pins 22 contacting, at sides thereof, sides of the conductive twisted cables. Preferably, the side of each conductive pin 22 forms a positioning trough 221 (FIG. 5A), which corresponds to the conductive twisted cable 3, whereby the conductive twisted cables 3 are receivable and thus positionable in the positioning troughs 221 of the conductive pins 22 and the conductive wires 32 of the conductive twisted cables 3 in electrical engagement with the conductive pins 22.

Figure 6:
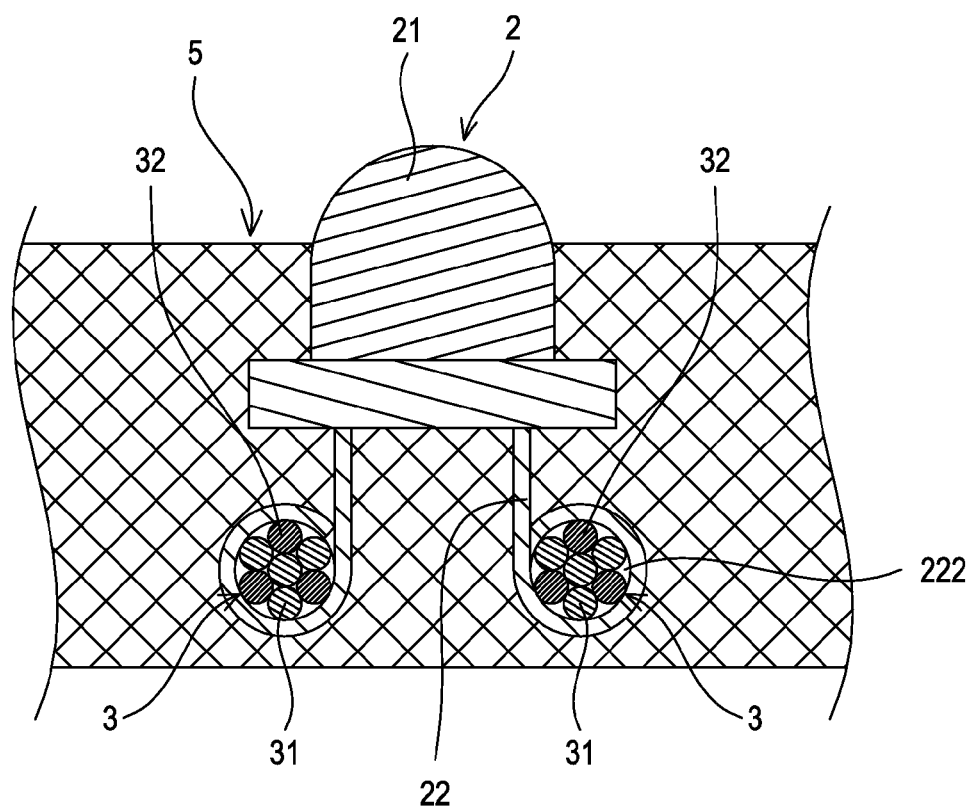
FIG. 6 shows an embodiment of the wirelessly-chargeable stretch-resistant light-emitting structure according to the present invention, wherein another light-emitting element is used.

Referring to a fifth embodiment according to the present invention shown in FIG. 6, each conductive pin 22 of the light-emitting element 2 forms a positioning portion 222, which in the embodiment illustrated in the drawing comprises a through hole through which the respective conductive twisted cable 3 is received and thus positioned therein, whereby the conductive twisted cables 3 are positioned in and by the positioning portions 222 of the conductive pins 22 and the conductive wires 32 of the conductive twisted cables 3 are in electrical engagement with the conductive pins 22.

Figure 7:
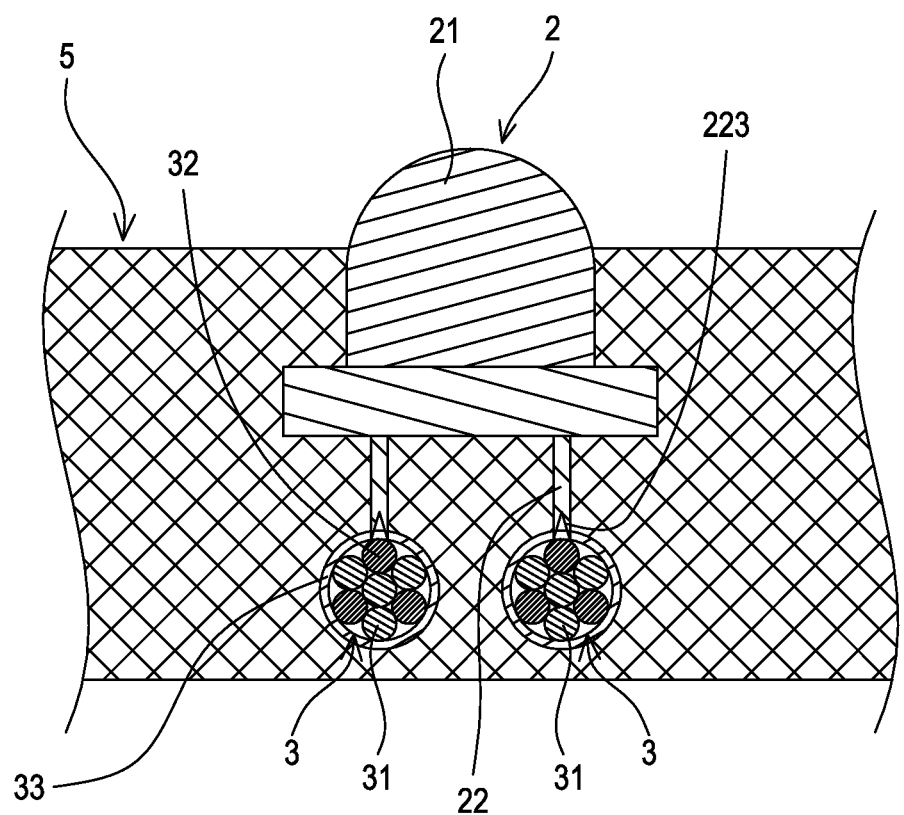
FIG. 7 shows an embodiment of the wirelessly-chargeable stretch-resistant light-emitting structure according to the present invention, wherein another light-emitting element having piercing tips is used.

Referring to a sixth embodiment according to the present invention shown in FIG. 7, each of the conductive twisted cables 3 is enclosed by an insulation layer 33, and each of the conductive pins 22 of the light-emitting element 2 comprises a piercing tip 223. The piercing tips 223 of the conductive pins 22 respectively pierce through the insulation layers 33 of the conductive twisted cables 3 to form electrical engagement with the conductive wires 32 housed in the insulation layers 33. The insulation layer 33 can be formed in various ways, of which one is soaking in a solution or liquid of insulation material.

The first to sixth embodiments discussed above can realize insulation through the following processes that are not demonstrated in the drawings. The first way is that the conductive twisted cables 3 that are electrically connected with the light-emitting elements 2 are soaked in a liquid of insulation material to each form an insulation layer thereon, and then, the conductive twisted cables 3 that are enclosed by the insulation layers and are electrically connected with the light-emitting elements 2 are woven (simply woven) in the woven member 5, but not limited thereto; the second way is that the conductive twisted cables 3 are first formed with insulation layers 33, and then woven (subjected to a weaving operation with yarns of the woven member 5) in the woven member 5 so as to combine with the woven member 5, and then the insulation layer 33 is processed to form a plurality of openings that expose the conductive wires 32, through which openings electrical connection with the light-emitting elements 2 can be made, and finally, packaging or sealing with resin may be made.

In the first embodiment discussed above, the conductive twisted cables 3 (two conductive twisted cables 3 as shown in the drawing) of each of the wirelessly-chargeable stretch-resistant light-emitting structures can be selectively first covered with insulation and then entangled and twisted together (not illustrated). It is apparent that this is applicable to the second to sixth embodiments (not illustrated).

In the first to sixth embodiments discussed above, each of the wirelessly-chargeable stretch-resistant light-emitting structures may omit the woven member 5, and instead, the two conductive twisted cables 3 are woven together with the threads of a sweater (not shown) so as to combined with the sweater.

Referring to FIGS. 1A, 1B, 2A, and 2B, the stretch-resistant heat-emitting structures are respectively mounted to front and back of the article 1. Each wirelessly-chargeable stretch-resistant heat-emitting structure comprises at least one carrying member 4, at least one electrical heating element 40, at least two conductive twisted cables 3, and a receiver circuit 8.

In the embodiment shown in the drawings, each wirelessly-chargeable stretch-resistant heat-emitting structure comprises a carrying member 4, an electrical heating element 40, two conductive twisted cables 3, and a receiver circuit 8.

The carrying member 4 is woven (simply woven) with the article 1. Similar to what discussed above, the conductive twisted cable 3 comprises at least one stretch-resistant wire 31 and at least one conductive wire 32 twisted together. In the embodiment illustrated, each conductive twisted cable 3 comprises a plurality of stretch-resistant wires 31 and a plurality of conductive wires 32. Preferably, each conductive wire 32 is a conductive wire made of a stretch-resistant material to provide the conductive wire 32 with the properties of stretch resistance, pull resistance, and deflectability, wherein the stretch-resistant wire 31 is more stretch-resistant than the conductive wire 32. The electrical heating element 40 is mounted on the carrying member 4, and the conductive wires 32 of the two conductive twisted cables 3 are electrically connected to the electrical heating element 40.

The electrical heating element 40 generates heat through electrical power transmitted through the conductive twisted cables 3. Preferably, the carrying member 4 comprises a heat spreader (not shown), whereby the electrical heating element 40 is in contact engagement with the heat spreader to allow heat to be uniformly distributed through the heat spreader, so that the article 1 to which the wirelessly-chargeable stretch-resistant heat-emitting structure according to the present invention is mounted can realize the function of uniform heating.

Referring to FIG. 4, the two conductive twisted cables 3 contained in the woven member 5 are further and electrically connected to the receiver circuit 8 (which is actually in electrical connection with the conductive wires 32 of the two conductive twisted cables 3, but for simplification of the description, in the following description, the conductive wire 32 will not be explicitly mentioned), whereby electrical power supplied from the rechargeable battery 84 of the receiver circuit 8 can be applied to the light-emitting elements 2 for emission of light.

Further, the two conductive twisted cables 3 contained in the woven member 5 are further electrically connected to a control circuit 6 and a switch 61, whereby the control circuit 6 and the switch 61 are electrically connected to the two conductive twisted cables 3. As such, the control circuit 6 controls the fashion of light emission of the light-emitting elements 2 (such as continuous emission, flashing, or lighting with various brightness). The control circuit 6 and the switch 61 may also be woven in the woven member 5 (not shown), or alternatively, as shown in the drawings, extending outside the woven member 5. In both arrangements, selective enclosure with insulation layer may be made to ensure electrical insulation in doing laundry or to realize insulating isolation in twisting conductive twisted cables 3 together. Further, to enhance control of the lighting fashion of the light-emitting element 2, at least one conductive twisted cable for controlling purposes (not shown in the drawings, but having the same structure as the conductive twisted cables 3) is additionally provided, whereby the controlling-purpose conductive twisted cable is in electrical connection with the control circuit 6 through conductive wire thereof and the controlling-purpose conductive twisted cable may transmit control signals from the control circuit 6. The two conductive twisted cables 3 and the controlling-purpose conductive twisted cable may be separately enclosed by an insulation layer and then twisted together (not shown) to provide improved stretch resistance and pull resistance.

In summary, the wirelessly-chargeable stretch-resistant light-emitting structure receives electrical power from the rechargeable battery 84 of the receiver circuit 8 for energizing the light-emitting elements 2 to give off light and comprises a switch 61 to selectively light on or off the light-emitting elements 2 and may further control, through the control circuit 6, the lighting fashion of the light-emitting elements 2.

Figure 8:
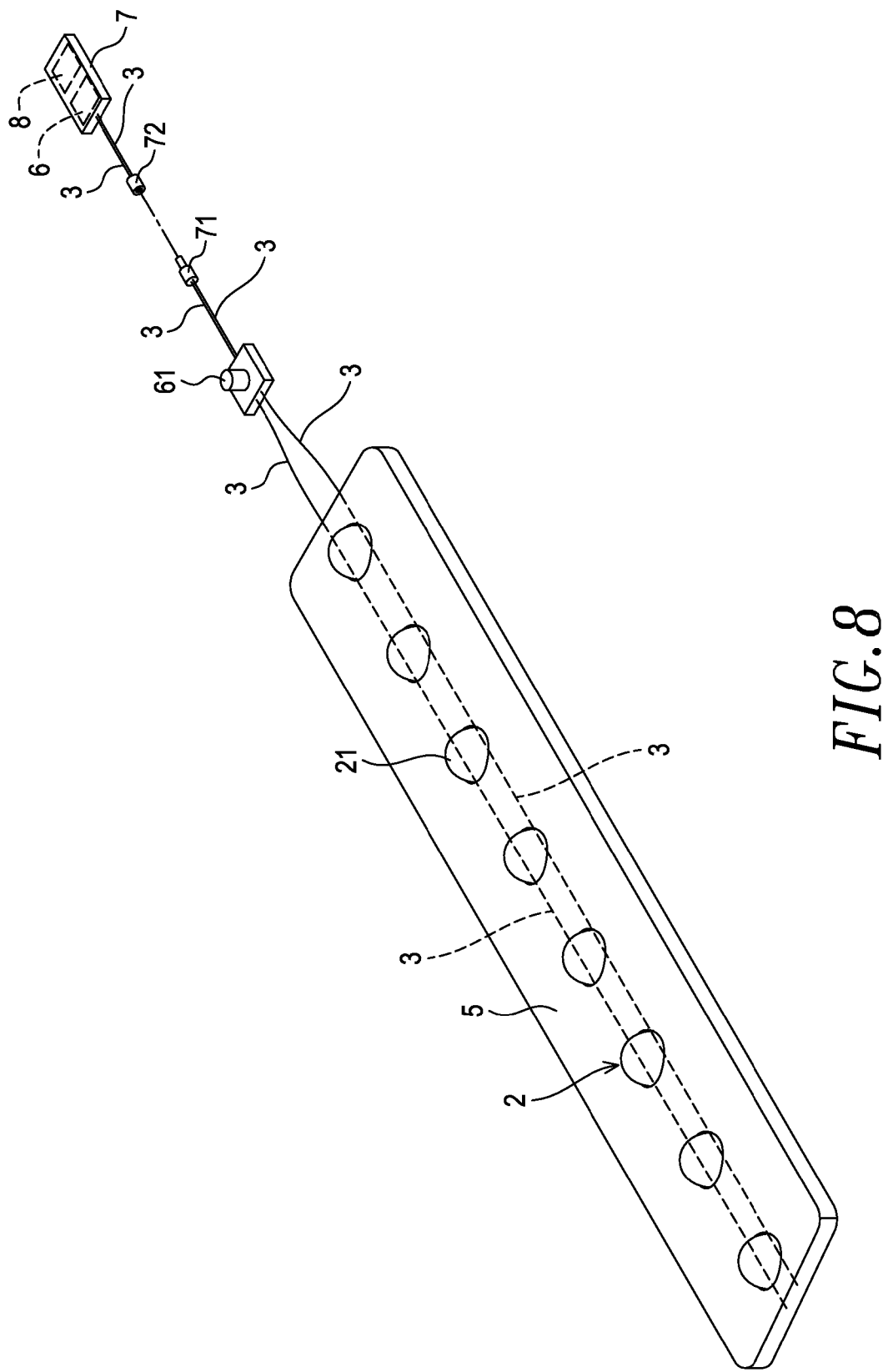
FIG. 8 is a schematic view showing a wirelessly-chargeable stretch-resistant light-emitting structure according to the present invention, wherein connectors are used to connect a rechargeable battery and a control circuit that are provided externally.

Referring to FIG. 8, external connection is used to replace the electrical connection with the receiver circuit 8 mentioned above (and preferably, the external connection comprises a control circuit 6). In the first to sixth embodiments according to the present invention, the wirelessly-chargeable stretch-resistant light-emitting structure comprises an external connecting member 7, a connector 71, and a switch 61. The connector 71 and the switch 61 are electrically connected to the two conductive twisted cables 3. The external connecting member 7 comprises a receiver circuit 8 and a control circuit 6 for controlling the lighting fashion of the light-emitting elements 2. The external connecting member 7 further comprises a connector 72 that is electrically connected to the control circuit 6 and is mateable with the connector 71. The external connecting member 7 is electrically connected through the mating engagement between the connector 72 and the connector 71. The switch 61 and the connector 71 may be selectively woven in the woven member 5 (not shown), or alternatively, extend outside the woven member 5. In both arrangements, selective enclosure with insulation layer may be made to ensure electrical insulation in doing laundry or to realize insulating isolation in twisting conductive twisted cables 3 together. Further, to enhance control of the lighting fashion of the light-emitting element 2, at least one conductive twisted cable for controlling purposes (not shown in the drawings, but having the same structure as the conductive twisted cables 3) is additionally provided, whereby the controlling-purpose conductive twisted cable is in electrical connection with the control circuit 6 through conductive wire thereof and the controlling-purpose conductive twisted cable may transmit control signals from the control circuit 6. The two conductive twisted cables 3 and the controlling-purpose conductive twisted cable may be separately enclosed by an insulation layer and then twisted together (not shown) to provide improved stretch resistance and pull resistance.

In summary, besides control of lighting on/off through the switch 61, selective external connection of the external connecting member 7 may be used to select use or no use of the rechargeable battery of the receiver circuit 8 and the control circuit 6.

Referring to FIGS. 1A, 1B, 2A, and 2B, the stretch-resistant heat-emitting structure is operated by turning on the switch 42 to allow electrical power to be supplied from the rechargeable battery 84 of the receiver circuit 8 to the heating element 40, so that the heating element 40 generates and emits heat. Preferably, as shown in the drawings, a control circuit 6 and a switch 61 are further provided and electrically connected. The control circuit 6, the switch 61, and the receiver circuit 8 are electrically connected to the conductive twisted cables 3 for electrical connection with the heating element 40. The switch 61 controls heating (ON) or non-heating (OFF) status of the heating element 40. The control circuit 6 controls heating operation of the heating element 40 (such as temperature and time counting).

Figure 9:
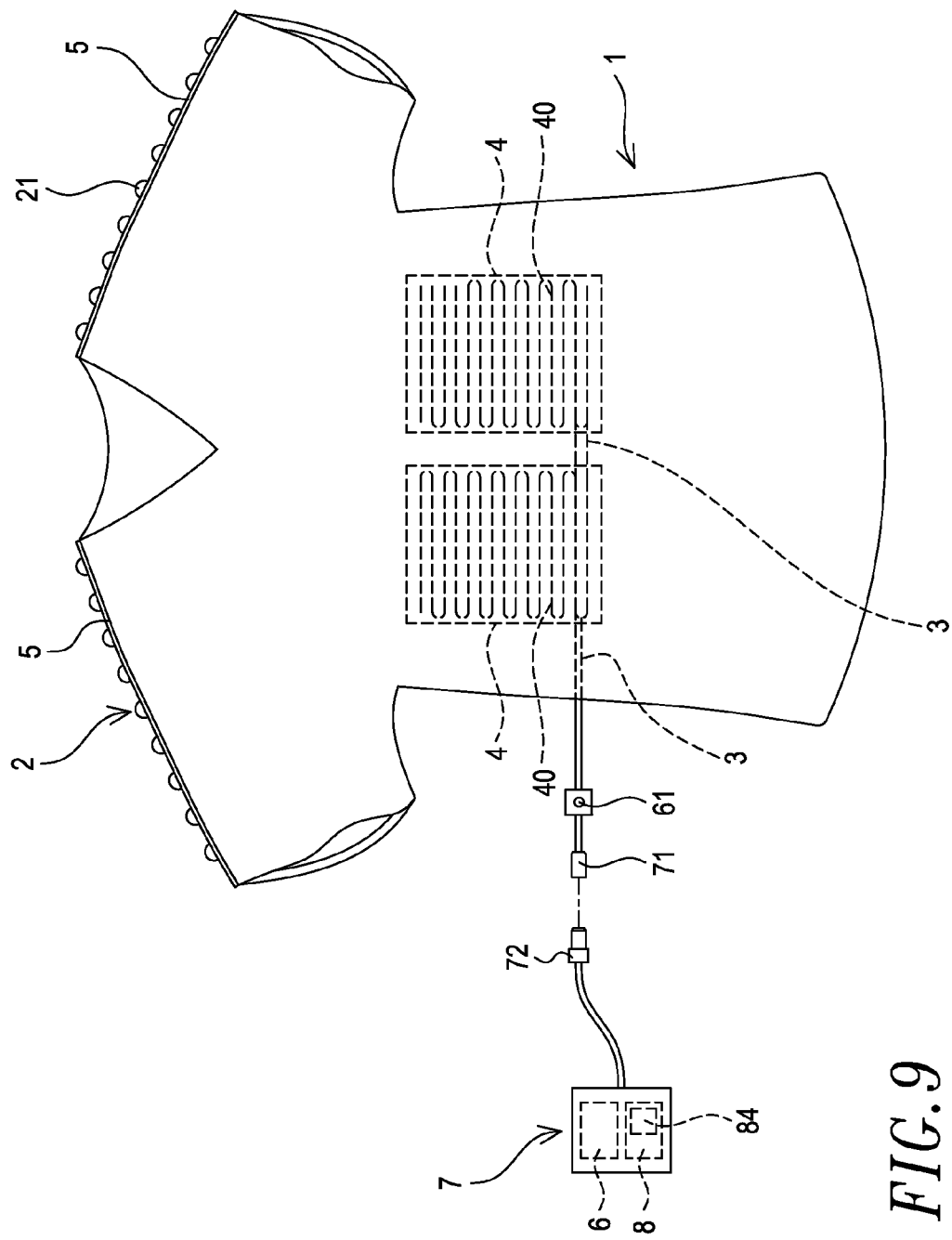
FIG. 9 is a schematic view showing a wirelessly-chargeable stretch-resistant heat-emitting structure according to the present invention, wherein connectors are used to connect a rechargeable battery and a control circuit that are provided externally (being already mounted to an article).

It is apparent that the receiver circuit 8 (or further comprising the control circuit 6) of the wirelessly-chargeable stretch-resistant heat-emitting structure can be connected in an external connection form (as shown in FIG. 9). The wirelessly-chargeable stretch-resistant heat-emitting structure further comprises a connector 71, a switch 61, and an external connecting member 7. The external connecting member 7 comprises a mateable counterpart connector 72, the control circuit 6, and the receiver circuit 8. The connector 71 and the switch 61 are electrically connected to the conductive twisted cables 3, while the control circuit 6, the receiver circuit 8, and the counterpart connector 72 of the external connecting member 7 are electrically connected together. As such, the external connecting member 7 is electrically connected through the mating engagement between the counterpart connector 72 and the connector 71.

As such, besides control of heating or not of the heating element 40 by the switch 61, selective external connection of the external connecting member 7 may be used to select use or no use of the rechargeable battery 84 of the receiver circuit 8 and the control circuit 6.

Further, the wirelessly-chargeable stretch-resistant light-emitting structure provided with the receiver circuit 8 as shown FIGS. 4 and 8 may have a portion extending outside the woven member 5 and attached to any desired location on the article 1. The wirelessly-chargeable stretch-resistant heat-emitting structure that is provided with the receiver circuit 8 has a portion extending outside the carrying member 4 and attached to the article 1 at locations as shown in FIGS. 1 and 2.

The features of the stretch-resistant light-emitting or heat-emitting structure according to the present invention are that through the unique arrangement of the conductive twisted cables 3, the wirelessly-chargeable stretch-resistant light-emitting structure that allows electrical power to transmit through the conductive twisted cables 3 to the light-emitting elements 2 and the wirelessly-chargeable stretch-resistant heat-emitting structure that allows electrical power to transmit through the conductive twisted cables 3 to the heating element 40 provide the functions of stretch resistance, pull resistance, water washability, and deflectability, in addition to light emission and heat emission, so as to be perfectly suitable for applications in an articles 1, such as garment, jacket, shirt, vest, underwear, pants, skirt, hat, glove, swimming suit, swimming cap, wet suit, sock, earmuffs, and bag and backpack. Further, the receiver circuit 8 that comprises a rechargeable battery 84 receives the AC signal transmitted by the transmitter circuit 91 of the charging device 9 and the AC signal is converted into electrical power to be stored in the rechargeable battery 84, whereby the rechargeable battery 84 may supply electrical power to the light-emitting elements 2 and the heating element 40; through the switch 61, the light-emitting element 2 can be controlled to light or not and the heating element 40 can be controlled to give off heat or not; through the control circuit 6, the lighting fashion of the light-emitting element 2 is controlled and the heating operation of the heating element 40 is controlled; and through the external connecting member 7, the use of the receiver circuit 8 and the control circuit 6 can be easily selected. Further, through the arrangement of a controlling-purpose conductive twisted cable, control signals from the control circuit 6 can be transmitted; and through the covering of insulation layer, electrical insulation in doing laundry may be ensured and insulating isolation may be realized in twisting conductive twisted cables 3 together. Further, the rechargeable battery 84 of the receiver circuit 8 may be a sheet like flexible battery, which was recently developed, to get better fit to applications in articles to be worn on a human body.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wirelessly-chargeable stretch-resistant heat-emitting structure, which is adapted to be used in an article, a charging device being coupled to the article, the charging device comprising a transmitter circuit and a power source connected to the transmitter circuit, the power source supplying electrical power to the transmitter circuit, the electrical power being converted by the transmitter circuit into an alternate-current signal, the wirelessly-chargeable stretch-resistant heat-emitting structure comprising:
   at least one carrying member, which is woven in the article;
   at least one electrical heating element, which is mounted to the carrying member;
   at least two conductive twisted cables, each of which comprises at least one stretch-resistant wire and at least one conductive wire twisted together, the conductive wires of the two conductive twisted cables each having an end electrically connected to the electrical heating element, wherein the stretch-resistant wire is more stretch-resistant than the conductive wire; and
   a receiver circuit, which is electrically connected to an opposite end of each of the conductive wires of the conductive twisted cables and comprises a rechargeable battery, the transmitter circuit transmitting the alternate-current signal to the receiver circuit, the receiver circuit receiving and converting the alternate-current signal to electrical power, which is stored in the rechargeable battery to be subsequently supplied to the electrical heating element.

2. The wirelessly-chargeable stretch-resistant heat-emitting structure as claimed in claim 1, wherein the carrying member comprises a heat spreader, the electrical heating element being in engagement with the heat spreader.

3. The wirelessly-chargeable stretch-resistant heat-emitting structure as claimed in claim 1 further comprising a switch, wherein the switch and the rechargeable battery are electrically connected through the conductive twisted cables to the electrical heating element.

4. The wirelessly-chargeable stretch-resistant heat-emitting structure as claimed in claim 3 further comprising a control circuit, wherein the switch, the rechargeable battery, and the control circuit are electrically connected through the conductive twisted cables to the electrical heating element.

5. The wirelessly-chargeable stretch-resistant heat-emitting structure as claimed in claim 1 further comprising an external connecting member, a connector, and a switch, wherein the connector and the switch are electrically connected through the conductive twisted cables to the electrical heating element, the external connecting member comprising the receiver circuit and a counterpart connector mateable with the connector, the counterpart connector being electrically connected to the rechargeable battery, the external connecting member being electrically connectable through mating engagement between the counterpart connector and the connector.

6. The wirelessly-chargeable stretch-resistant heat-emitting structure as claimed in claim 5, wherein the external connecting member further comprises a control circuit, the counterpart connector and the rechargeable battery of the external connecting member being electrically connected to the control circuit.

7. The wirelessly-chargeable stretch-resistant heat-emitting structure as claimed in claim 1, wherein the transmitter circuit comprises an oscillation and frequency-division circuit, a driving and amplifying circuit, a primary transmitting resonant circuit, and a transmitter coil, the oscillation and frequency-division circuit being connected to the power source, the oscillation and frequency-division circuit converting the electrical power supplied from the power source into an alternate-current signal, the driving and amplifying circuit being connected to the oscillation and frequency-division circuit, the driving and amplifying circuit amplifying the alternate-current signal that is formed by the oscillation and frequency-division circuit, the primary transmitting resonant circuit being connected to the driving and amplifying circuit, the primary transmitting resonant circuit providing resonance to the amplified alternate-current signal, the transmitter coil being connected to the primary transmitting resonant circuit transmitting the alternate-current signal that is subjected to resonance by the primary transmitting resonant circuit to the receiver circuit.

8. The wirelessly-chargeable stretch-resistant heat-emitting structure as claimed in claim 7, wherein the transmitter circuit further comprises a feedback detection circuit and a control regulation circuit, the feedback detection circuit being connected to the transmitter coil, the control regulation circuit being connected to the feedback detection circuit and the oscillation and frequency-division circuit, whereby the feedback detection circuit feeds the alternate-current signal transmitted by the transmitter coil back to the control regulation circuit to allow the control regulation circuit to regulate oscillation frequency of the oscillation and frequency-division circuit.

9. The wirelessly-chargeable stretch-resistant heat-emitting structure as claimed in 1, wherein the receiver circuit comprises a receiver induction coil, a secondary receiving resonant circuit, and an AC/DC rectification and filtering regulation circuit, the receiver induction coil receiving an alternate-current signal transmitted from the transmitter circuit, the secondary receiving resonant circuit being connected to the receiver induction coil, the secondary receiving resonant circuit providing resonance to the alternate-current signal received by the receiver induction coil, the AC/DC rectification and filtering regulation circuit being connected to the secondary receiving resonant circuit, the AC/DC rectification and filtering regulation circuit performing rectification and regulation of the alternate-current signal that is subjected to resonance by the secondary receiving resonant circuit so as to convert the alternate-current signal into electrical power, the AC/DC rectification and filtering regulation circuit being connected to the rechargeable battery so as to store the electrical power obtained by the performance of the AC/DC rectification and filtering regulation circuit to the rechargeable battery.

10. The wirelessly-chargeable stretch-resistant heat-emitting structure as claimed in claim 1, wherein the coupling between the charging device and the article is realized through one of clamping, bonding, adhering, and mutual attraction.

* * * * *